US008985451B2

(12) United States Patent
Yamashita et al.

(10) Patent No.: US 8,985,451 B2
(45) Date of Patent: Mar. 24, 2015

(54) COMMUNICATION APPARATUS, COMMUNICATION METHOD, AND PROGRAM

(75) Inventors: Katsuya Yamashita, Tokyo (JP); Kazuyuki Sakamoto, Chiba (JP)

(73) Assignee: Sony Corporation, Tokyo (JP)

( * ) Notice: Subject to any disclaimer, the term of this patent is extended or adjusted under 35 U.S.C. 154(b) by 1505 days.

(21) Appl. No.: 11/344,359

(22) Filed: Jan. 30, 2006

(65) Prior Publication Data

US 2006/0180666 A1    Aug. 17, 2006

(30) Foreign Application Priority Data

Jan. 31, 2005   (JP) ................................. 2005-023433

(51) Int. Cl.
*G06K 7/08*   (2006.01)
*G06K 7/10*   (2006.01)
*G06K 7/00*   (2006.01)

(52) U.S. Cl.
CPC .......... *G06K 7/10039* (2013.01); *G06K 7/0008* (2013.01)
USPC ........................................................ 235/451

(58) Field of Classification Search
CPC ...... G06K 7/0008; G06F 3/1454; G06F 3/147
USPC ........................................................ 235/451
See application file for complete search history.

(56) References Cited

U.S. PATENT DOCUMENTS

| | | | |
|---|---|---|---|
| 5,841,770 A | 11/1998 | Snodgrass et al. | |
| 6,330,699 B1 | 12/2001 | Yoshioka et al. | |
| 6,650,635 B1 * | 11/2003 | Weinstein et al. | 370/352 |
| 2002/0040261 A1 * | 4/2002 | Nakamoto et al. | 701/1 |
| 2002/0055365 A1 * | 5/2002 | Yamato | 455/466 |

FOREIGN PATENT DOCUMENTS

| | | |
|---|---|---|
| EP | 1 193 924 | 4/2002 |
| JP | 07-022996 | 1/1995 |
| JP | 09-186739 | 7/1997 |

(Continued)

OTHER PUBLICATIONS

D. Baddeley, ISO/IEC 14443-3 Final Committee Draft, Jun. 11, 1999.*

(Continued)

*Primary Examiner* — Rafferty Kelly
(74) *Attorney, Agent, or Firm* — K&L Gates LLP (57) ABSTRACT

A communication apparatus performing communication in a noncontact manner is provided. The communication apparatus includes a transmission control unit configured to transmit a command; a timeout period checking unit configured to check whether a timeout period during which a response to the command is waited for has elapsed; a retransmission control unit configured to retransmit the command only after the timeout period has elapsed; an error checking unit configured to check whether data received within the timeout period has an error; and a processing unit configured to regard the data received within the timeout period as a correct response to the command if the data does not have an error and perform a process in accordance with the response. If the data received within the timeout period has an error, the retransmission control unit does not retransmit the command and the timeout period checking unit continues to check whether the timeout period has elapsed.

6 Claims, 8 Drawing Sheets

(56) References Cited

FOREIGN PATENT DOCUMENTS

| | | |
|---|---|---|
| JP | 10-124633 | 5/1998 |
| JP | 10-171944 | 6/1998 |
| JP | 10-293824 | 11/1998 |
| JP | 11-345294 | 12/1999 |
| JP | 2000-020651 | 1/2000 |
| JP | 2003-030594 | 1/2003 |
| JP | 2003-030595 | 1/2003 |
| JP | 2003-196611 | 7/2003 |
| JP | 2003-258814 | 9/2003 |
| JP | 2003-308501 | 10/2003 |

OTHER PUBLICATIONS

Japanese Office Action (for JP 2005-023433) issued on Feb. 3, 2009.

* cited by examiner

COMMUNICATION APPARATUS, COMMUNICATION METHOD, AND PROGRAM

CROSS REFERENCES TO RELATED INVENTIONS

The present application claims priority to Japanese Patent Invention JP 2005-023433 filed in the Japanese Patent Office on Jan. 31, 2005, the entire contents of which are incorporated herein by reference.

BACKGROUND

The present application relates to a communication apparatus, a communication method, and a program. Particularly, the present application relates a communication apparatus, a communication method, and a program that enables a reader/writer communicating with an IC (integrated circuit) card in a noncontact manner to easily communicate with the IC card even if interference occurs between the reader/writer and another reader/writer.

Recently, a noncontact IC card system, in which an IC card and a reader/writer communicate with each other in a noncontact manner through electromagnetic waves, has rapidly become widespread.

In the noncontact IC card system, a reader/writer outputs electromagnetic waves. When an IC card is held over the reader/writer, the IC card operates by obtaining power from mutual induction caused by the electromagnetic waves output from the reader/writer and starts communication with the reader/writer. The reader/writer transmits data to the IC card by modulating electromagnetic waves output therefrom. On the other hand, the IC card transmits data to the reader/writer by modulating non-modulated electromagnetic waves output from the reader/writer by so-called load modulation.

As described above, in the noncontact IC card system, the IC card and the reader/writer communicate with each other in a noncontact manner. This system is highly convenient and is now widely used in, for example, automatic ticket gates in stations.

The automatic ticket gates are required to deal with entrance/exit of many people in short time and thus are required to be provided with many readers/writers. However, readers/writers functioning as automatic ticket gates are placed in a limited space of a gate of a station. If many readers/writers are to be placed, the readers/writers are inevitably close to each other.

In such a case where readers/writers are close to each other, if the readers/writers use carrier waves of the same frequency, electromagnetic waves output from the readers/writers cause mutual interference, so that the readers/writers may not be able to communicate with an IC card held thereover.

Figure 1:
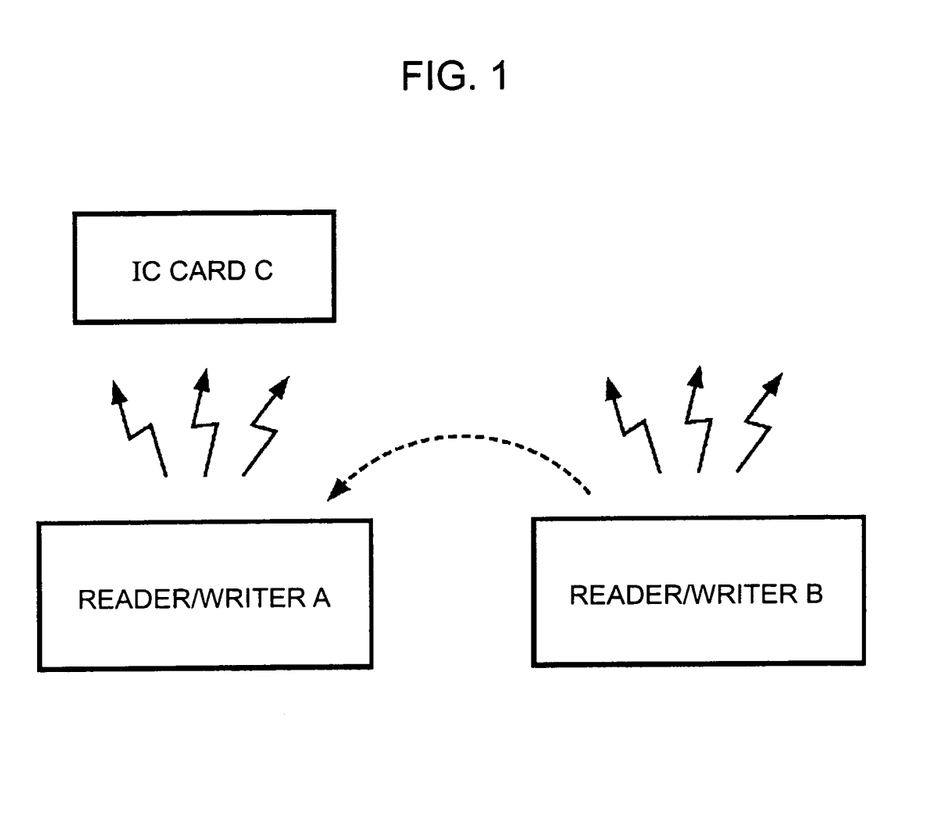
FIG. 1 shows a state where a plurality of readers/writers are causing interference.

FIG. 1 shows a state where a plurality of readers/writers are causing interference.

In FIG. 1, an IC card C is held over a reader/writer A, and thus the reader/writer A should communicate with only the IC card C.

However, if another reader/writer B exists close to the reader/writer A, as shown in FIG. 1, electromagnetic waves output from the reader/writer A and those output from the reader/writer B cause mutual interference, and as a result, the electromagnetic waves that caused mutual interference are received by the reader/writer A as electromagnetic waves that are load-modulated by the IC card C. Accordingly, the communication between the reader/writer A and the IC card C is interfered.

In order to prevent such interference of communication between the reader/writer A and the IC card C, a first method is suggested. In the first method, the readers/writers A and B are placed with a predetermined distance therebetween so that the electromagnetic waves output therefrom do not cause mutual interference.

In the first method, however, the number of readers/writers that can be placed in a gate reduces. As a result, it becomes difficult to deal with entrance/exit of many people in short time.

There are also suggested a second method of providing an interference detecting unit to detect interference in a reader/writer so that data communication is not performed while interference is caused (e.g., see Japanese Unexamined Patent Invention Publication No. 10-293824); a third method of inverting the phase of a radiation field between adjacent readers/writers (e.g., see Japanese Unexamined Patent Invention Publication No. 11-345294); and a fourth method of providing a function to change the frequency of carrier waves in a reader/writer (e.g., see Japanese Unexamined Patent Invention Publication No. 2000-20651).

However, in the second method, a hardware device serving as the interference detecting unit needs to be provided in the reader/writer, which increases the cost of the reader/writer.

In the third method of inverting the phase of a radiation field between adjacent readers/writers, a hardware device to invert the phase needs to be provided. Further, in the third method, a setter needs to set readers/writers by designing the setting positions thereof so as to satisfy a setting condition in which the radiation field is absolutely inverted in adjacent readers/writers, which is inconvenient.

In the fourth method, a setter of readers/writers needs to manage the frequency of carrier waves of the readers/writers. Particularly, a heavy load is imposed on the setter when a reader/writer is added or when the positions of the readers/writers are changed.

Further, a fifth method is suggested. In the fifth method, if a reception error occurs, that is, if a reader/writer cannot receive a correct response packet from an IC card, the reader/writer retransmits a command packet to the IC card (make a retry to transmit the command packet).

More specifically, packets are transmitted/received through noncontact communication between a reader/writer and an IC card constituting a noncontact IC card system. The reader/writer transmits a command packet, which is a packet including information of a command to execute a predetermined process, to the IC card. The IC card transmits a response packet, which is a packet including a response to the command packet from the reader/writer, to the reader/writer.

In the fifth method, the reader/writer transmits a command packet, waits for and receives a packet (response packet), and checks whether the packet has an error. If the packet received by the reader/writer has an error, the reader/writer immediately retransmits the command packet. After that, the reader/writer repeats receiving a packet (response packet), error check of the packet, and retransmission of the command packet until receiving a correct response packet from the IC card.

The fifth method is effective for the interference caused in the following example. For example, an IC card exists near an IC card held over a reader/writer. Under this condition, both IC cards react to a command packet transmitted from the reader/writer and transmit response packets to the command packet, which causes interference.

However, when interference is caused between the two readers/writers A and B close to each other, as described above with reference to FIG. 1, the communication performance between the reader/writer A and the IC card C held thereover cannot always be improved by the fifth method of retransmitting a command packet. Rather, the communication performance may degrade.

Figure 2:
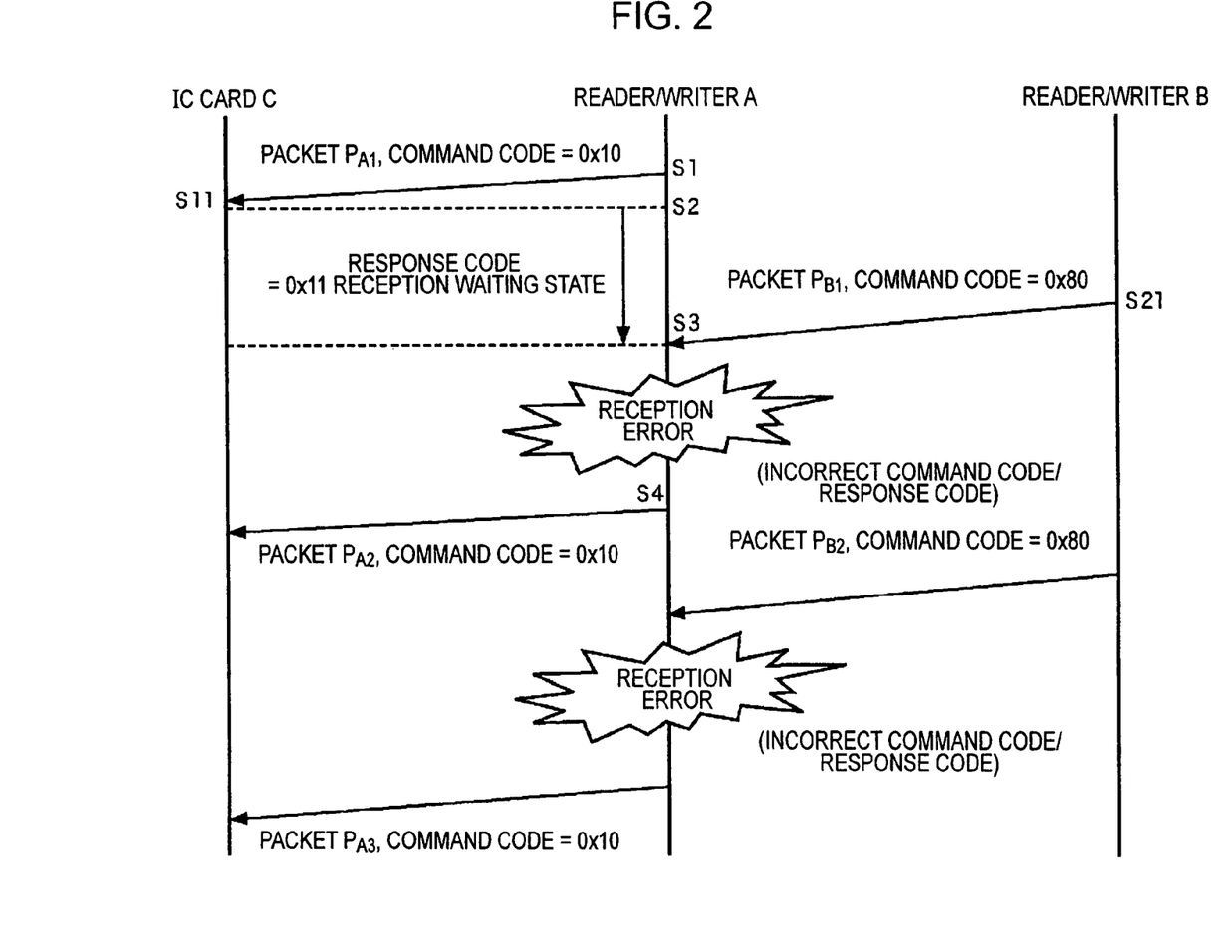
FIG. 2 is a flowchart (arrow chart) illustrating the operations of readers/writers A and B and an IC card C.
Figure 3:
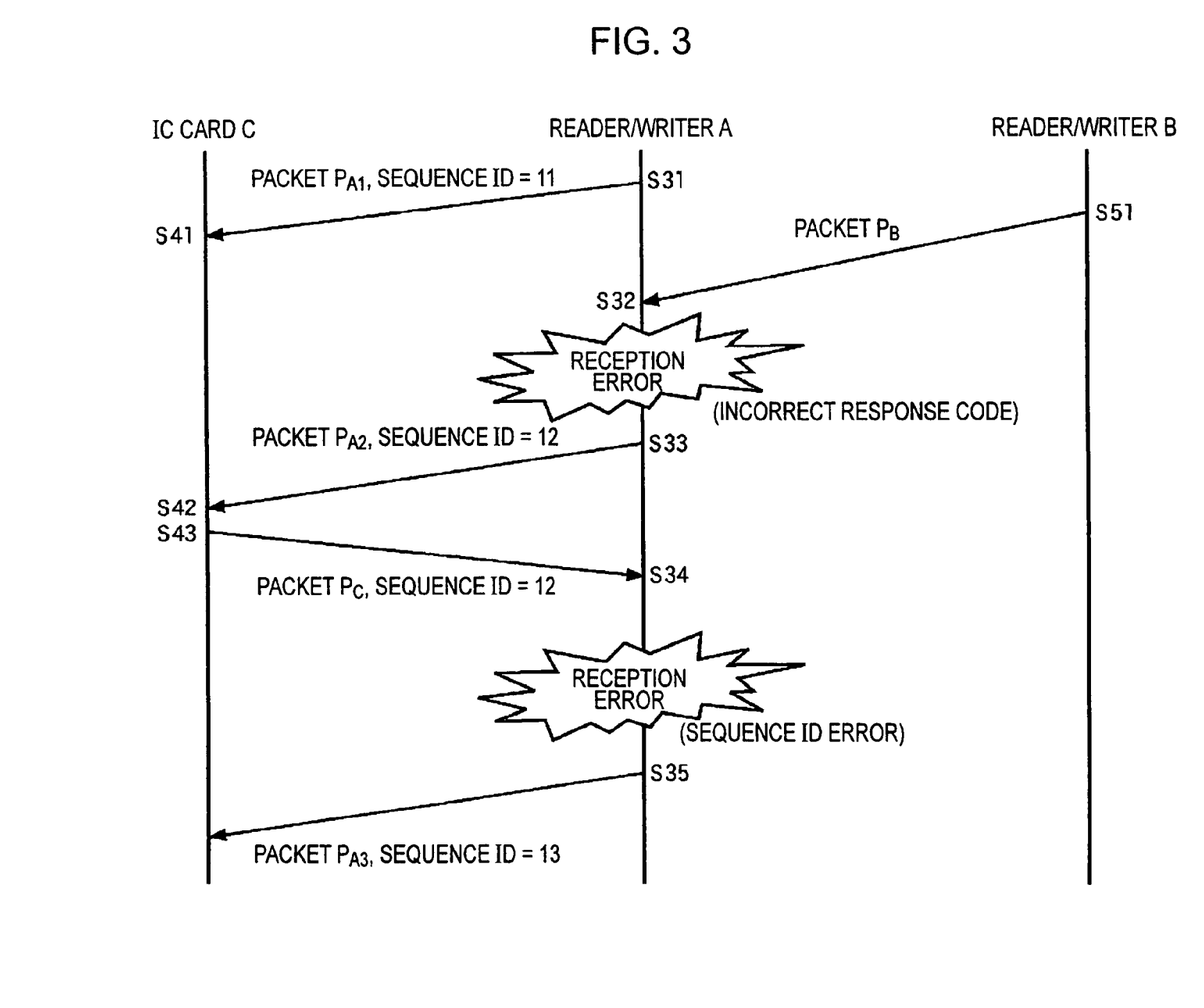
FIG. 3 is a flowchart illustrating the operations of the readers/writers A and B and the IC card C.

FIGS. 2 and 3 show the operations of the readers/writers A and B and the IC card C performed when the IC card C is held over the reader/writer A among the two readers/writers A and B close to each other.

Referring to FIG. 2, the reader/writer A transmits a command packet PA1 having a command code of 0x10 ("0x" indicates that the character (string) following thereafter is a hexadecimal number) in step S1. Then, the process proceeds to step S2, where the reader/writer A enters a reception waiting state to wait for receiving a response packet to the command packet $P_{A1}$.

Each packet transmitted/received between the reader/writer A or B and the IC card C includes a command code or a response code representing the type of the packet. The command code or the response code indicates that the packet is a command packet or a response packet.

In FIG. 2, the reader/writer A transmits the command packet $P_{A1}$ having a command code of 0x10 in step S1. Assuming that a response code of a response packet to the command packet having the command code 0x10 is 0x11, for example, the reader/writer A waits for receiving a packet (response packet) having a response code of 0x11 in the reception waiting state in step S2.

On the other hand, the IC card C receives the command packet $P_{A1}$ having the command code 0x10 transmitted from the reader/writer A and starts a process in accordance with the command packet $P_{A1}$ in step S11. After performing the process in accordance with the command packet $P_{A1}$ from the reader/writer A, the IC card C transmits a response packet having a response code of 0x11 in response to the command packet $P_{A1}$.

On the other hand, the reader/writer B performs polling to detect that an IC card is held thereover (that an IC card exists at a nearby position). Specifically, the reader/writer B periodically transmits a command packet having a command code of 0x80.

In FIG. 2, the reader/writer B transmits a command packet PB1 having the command code 0x80 in step S21. Further, the reader/writer B periodically transmits a command packet having the command code 0x80.

When the reader/writer B transmits the packet $P_{B1}$ in step S21, the reader/writer A is in the reception waiting state in step S2 and thus receives the packet PB1 from the reader/writer B in step S3.

However, the packet $P_{B1}$ from the reader/writer B is a command packet having the command code 0x80 and is not a response packet to the command packet $P_{A1}$ to be received, that is, a packet having the response code 0x11. Therefore, the reader/writer A determines that the packet $P_{B1}$ received in step S3 has an error and retransmits the command packet in step S4. In other words, the reader/writer A transmits a command packet $P_{A2}$ having the command code 0x10.

In this case, if the IC card C transmits a response packet to the command packet $P_{A1}$ while the reader/writer A is retransmitting the command packet having the command code 0x10, the reader/writer A cannot receive the response packet from the IC card C.

A packet transmitted between a reader/writer and an IC card constituting a noncontact IC card system may include a sequence ID (identification). The sequence ID is a value that is incremented by one by authorized reader/writer and IC card in order to prevent so-called masquerading, in which an unauthorized reader/writer or IC card interrupts the communication performed by the authorized reader/writer and IC card and masquerades as an authorized reader/writer or IC card.

FIG. 3 shows the operations of the readers/writers A and B and the IC card C in a case where packets including a sequence ID are transmitted between the reader/writer A or B and the IC card C.

In step S31, the reader/writer A transmits a packet (command packet) $P_{A1}$ having a sequence ID of 11 and enters a reception waiting state to wait for receiving a response packet to the command packet $P_{A1}$, as in the case shown in FIG. 2.

In step S41, the IC card C held over the reader/writer A receives the packet $P_{A1}$ from the reader/writer A and starts a process in accordance with the packet $P_{A1}$.

On the other hand, the reader/writer B performs polling as in FIG. 2. In FIG. 3, the reader/writer B transmits a packet (command packet) $P_B$ in step S51.

When the reader/writer B transmits the packet $P_B$ in step S51, the reader/writer A is in the reception waiting state. Then, in step S32, the reader/writer A receives the packet $P_B$ from the reader/writer B.

The packet $P_B$ from the reader/writer B is a command packet and is not a response packet to the command packet $P_{A1}$ to be received by the reader/writer A.

Therefore, as in FIG. 2, the reader/writer A determines that the packet $P_B$ received in step S32 has an error, and retransmits a packet (command packet) in step S33. That is, the reader/writer A transmits a packet $P_{A2}$ as a retransmission of the packet $P_{A1}$.

At this time, the reader/writer A increments the sequence ID by one. Specifically, since the sequence ID of the previously transmitted packet $P_{A1}$ is 11, the sequence ID of the packet $P_{A2}$ is set to 12.

In step S42, the IC card C receives the packet $P_{A2}$ from the reader/writer A.

After the IC card C completes the process in accordance with the packet $P_{A1}$ including the sequence ID 11 received in step S41, the IC card C transmits a packet $P_C$ in response to the packet $P_{A1}$ in step S43.

The packet $P_C$ is a response packet to the packet $P_{A1}$ including the sequence ID 11 from the reader/writer A. Therefore, the IC card C increments the sequence ID of the packet $P_C$ by one into 12.

In step S34, the reader/writer A receives the packet $P_C$ from the IC card C. However, the sequence ID of this packet $P_C$ is 12, which is not a value (13) generated by incrementing the sequence ID 12 of the packet $P_{A2}$ that was previously transmitted by the reader/writer A by one.

Therefore, the reader/writer A determines that the packet $P_C$ received in step S34 has an error (in this case, the packet $P_C$ is determined to be an incorrect packet), and retransmits a packet in step S35. That is, the reader/writer A transmits a packet $P_{A3}$ as a retransmission of the packet $P_{A1}$.

At this time, since the sequence ID of the previously transmitted packet $P_{A2}$ is 12, the reader/writer A sets the sequence ID of the packet $P_{A3}$ to 13 by incrementing 12 by one.

The packet $P_C$ that is received by the reader/writer A in step S34 is a correct response packet to the packet $P_{A1}$ that is transmitted by the reader/writer A in step S31. However, the packet $P_C$ is transmitted from the IC card C after the reader/writer A transmitted the packet $P_{A2}$ in step S33 as a retransmission of the packet $P_{A1}$. Therefore, the reader/writer A regards the response packet $P_C$, which is a correct response packet to the packet $P_{A1}$, as an incorrect response packet to the packet $P_{A2}$, determines that an error has occurred, and retransmits the command packet.

As described above, if the reader/writer A retransmits a packet immediately after detecting an error in a received packet, retransmission of the packet frequently occurs every time an error is detected in a packet received by the reader/writer A due to interference caused between the readers/writers A and B. This interferes with the communication between the reader/writer A and the IC card C held thereover. Accordingly, the communication performance (responsibility of the IC card C) degrades, which results in a decrease in the reliability of the entire noncontact IC card system.

SUMMARY

The present invention has been made in view of these circumstances and is directed to enabling effective communication between a reader/writer and an IC card even under the environment where a plurality of readers/writers cause interference.

A communication apparatus according to an embodiment includes: a transmission control unit configured to transmit a command; a timeout period checking unit configured to check whether a timeout period during which a response to the command is waited for has elapsed; a retransmission control unit configured to retransmit the command only after the timeout period has elapsed; an error checking unit configured to check whether data received within the timeout period has an error; and a processing unit configured to regard the data received within the timeout period as a correct response to the command if the data does not have an error and perform a process in accordance with the response. If the data received within the timeout period has an error, the retransmission control unit does not retransmit the command and the timeout period checking unit continues to check whether the timeout period has elapsed.

A communication method according to an embodiment includes the steps of: controlling transmission to transmit a command; checking whether a timeout period during which a response to the command is waited for has elapsed; controlling retransmission to retransmit the command only after the timeout period has elapsed; checking whether data received within the timeout period has an error; and regarding the data received within the timeout period as a correct response to the command if the data does not have an error and performing a process in accordance with the response. If the data received within the timeout period has an error, the command is not retransmitted in the retransmission control step, and checking whether the timeout period has elapsed is continued in the timeout period checking step.

A program according to an embodiment includes the steps of: controlling transmission to transmit a command; checking whether a timeout period during which a response to the command is waited for has elapsed; controlling retransmission to retransmit the command only after the timeout period has elapsed; checking whether data received within the timeout period has an error; and regarding the data received within the timeout period as a correct response to the command if the data does not have an error and performing a process in accordance with the response. If the data received within the timeout period has an error, the command is not retransmitted in the retransmission control step, and checking whether the timeout period has elapsed is continued in the timeout period checking step.

In an embodiment, a command is transmitted, and it is checked whether a timeout period during which a response to the command is waited for has elapsed. Only after the timeout period has elapsed, the command is retransmitted. Also, whether data received within the timeout period has an error is checked. If the data received within the timeout period does not have an error, the received data is regarded as a correct response to the command and a process is performed in accordance with the response. On the other hand, if the data received within the timeout period has an error, the command is not retransmitted, but checking whether the timeout period has elapsed is continued.

According to embodiments, noncontact communication can be easily performed under an environment where interference occurs. More specifically, even if a reader/writer communicating with an IC card in a noncontact manner is in an environment where interference is caused between the reader/writer and another reader/writer, the reader/writer can easily communicate with the IC card.

Additional features and advantages are described herein, and will be apparent from, the following Detailed Description and the figures.

DETAILED DESCRIPTION

Figure 4:
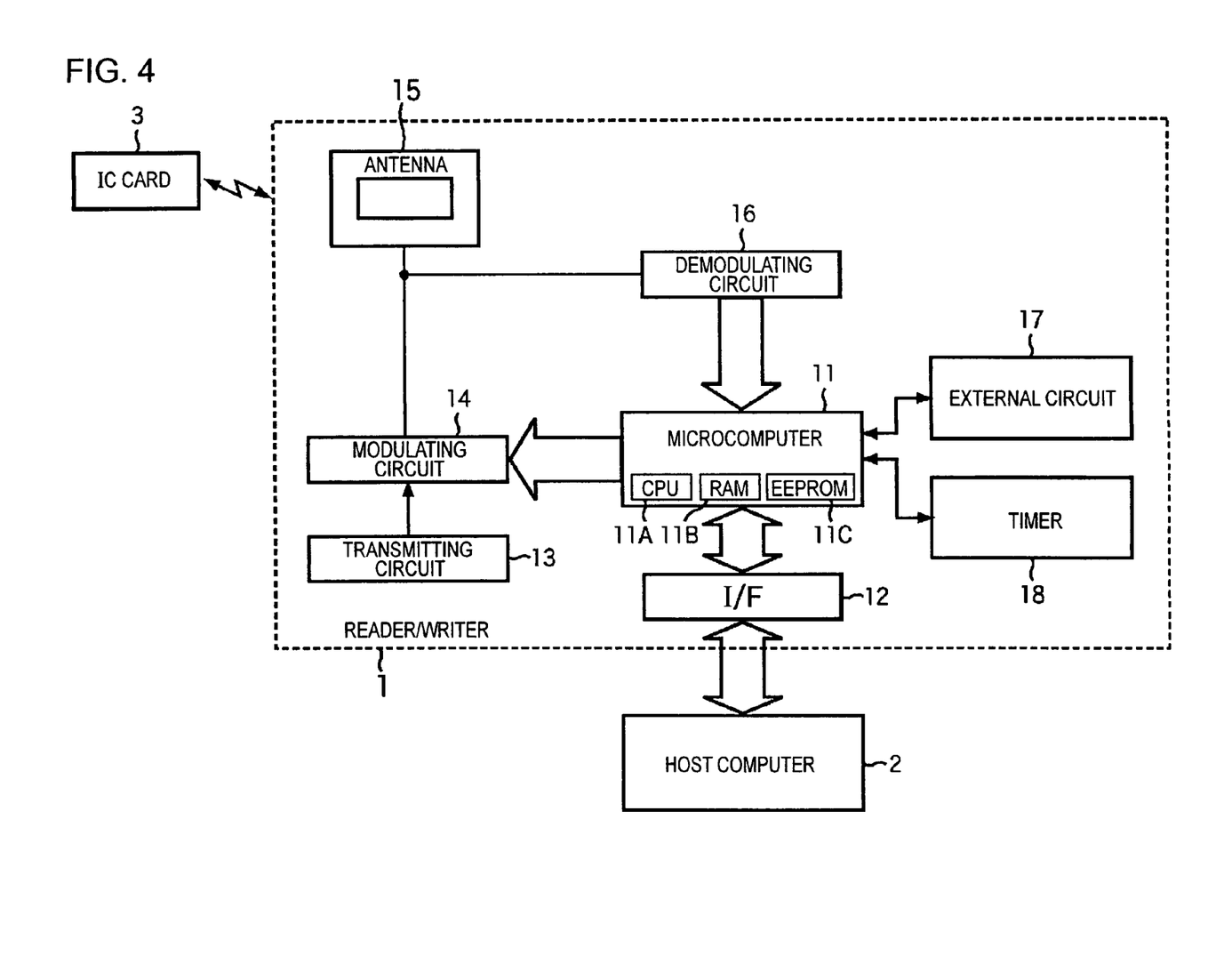
FIG. 4 is a block diagram showing an example of the configuration of an IC card system according to an embodiment.

The communication apparatus according to an embodiment is a communication apparatus performing communication in a noncontact manner (e.g., the reader/writer 1 shown in FIG. 4). The communication apparatus includes: a transmission control unit (e.g., the microcomputer 11 shown in FIG. 4 to perform step S102 shown in FIG. 6) configured to transmit a command; a timeout period checking unit (e.g., the microcomputer 11 shown in FIG. 4 to perform step S104 shown in FIG. 6) configured to check whether a timeout period during which a response to the command is waited for has elapsed; a retransmission control unit (e.g., the microcomputer 11 shown in FIG. 4 to perform step S110 shown in FIG. 6) configured to retransmit the command only after the timeout period has elapsed; an error checking unit (e.g., the microcomputer 11 shown in FIG. 4 to perform step S106, S107, or S108 shown in FIG. 6) configured to check whether data received within the timeout period has an error; and a processing unit (e.g., the microcomputer 11 shown in FIG. 4 to perform step S109 shown in FIG. 6) configured to regard the data received within the timeout period as a correct response to the command if the data does not have an error and perform a process in accordance with the response. If the data received within the timeout period has an error, the retransmission control unit does not retransmit the command and the timeout period checking unit continues to check whether the timeout period has elapsed.

The communication method according to an embodiment is a communication method for a communication apparatus performing communication in a noncontact manner (e.g., the reader/writer 1 shown in FIG. 4). The communication method includes the steps of: controlling transmission to transmit a command (e.g., step S102 shown in FIG. 6); checking whether a timeout period during which a response to the command is waited for has elapsed (e.g., step S104 shown in FIG. 6); controlling retransmission to retransmit the command only after the timeout period has elapsed (e.g., step S110 shown in FIG. 6); checking whether data received within the timeout period has an error (e.g., step S106, S107, or S108 shown in FIG. 6); and regarding the data received within the timeout period as a correct response to the command if the data does not have an error and performing a process in accordance with the response (e.g., step S109 shown in FIG. 6). If the data received within the timeout period has an error, the command is not retransmitted in the retransmission control step, and checking whether the timeout period has elapsed is continued in the timeout period checking step.

The program according to an embodiment is a program executed by a computer (e.g., (the CPU 11A of) the microcomputer 11 shown in FIG. 4) controlling a communication apparatus performing communication in a noncontact manner (e.g., the reader/writer 1 shown in FIG. 4). The program includes the steps of: controlling transmission to transmit a command (e.g., step S102 shown in FIG. 6); checking whether a timeout period during which a response to the command is waited for has elapsed (e.g., step S104 shown in FIG. 6); controlling retransmission to retransmit the command only after the timeout period has elapsed (e.g., step S110 shown in FIG. 6); checking whether data received within the timeout period has an error (e.g., step S106, S107, or S108 shown in FIG. 6); and regarding the data received within the timeout period as a correct response to the command if the data does not have an error and performing a process in accordance with the response (e.g., step S109 shown in FIG. 6). If the data received within the timeout period has an error, the command is not retransmitted in the retransmission control step, and checking whether the timeout period has elapsed is continued in the timeout period checking step.

Hereinafter, an embodiment is described with reference to the drawings.

FIG. 4 shows an example of the configuration of an IC card system according to the embodiment of the present invention.

In the IC card system shown in FIG. 4, a reader/writer 1 operates under control by a host computer 2 and communicates with an IC card 3 in a noncontact manner.

The reader/writer 1 includes a microcomputer 11, an I/F (interface) 12, a transmitting circuit 13, a modulating circuit 14, an antenna 15, a demodulating circuit 16, an external circuit 17, and a timer 18.

The microcomputer 11 includes a CPU (central processing unit) 11A, a RAM (random access memory) 11B, and an EEPROM (electrically erasable programmable read only memory) 11C, and controls each unit of the reader/writer 1 and performs various processes by executing a program.

More specifically, the CPU 11A executes a program stored in the EEPROM 11C (by loading the program into the RAM 11B as necessary). By executing the program, the CPU 11A generates a packet (command packet) to be transmitted to the IC card 3, controls transmission to transmit the packet through electromagnetic waves, checks whether a timeout period (described below) has elapsed, and controls retransmission to retransmit the packet through electromagnetic waves. Further, the CPU 11A checks whether a packet (received data) that is received by the antenna 15 and is supplied from the demodulating circuit 16 has an error, and performs a process in accordance with a correct response packet having no error from the IC card 3.

The CPU 11A generates a packet to be transmitted to the IC card 3 and supplies the packet to the modulating circuit 14 so as to transmit the packet through electromagnetic waves. At that time, the CPU 11A encodes the packet to be supplied to the modulating circuit 14 into a Manchester code or the like. In addition, the CPU 11A receives a packet that is received by the antenna 15 and is supplied from the demodulating circuit 16. Since the packet is encoded in a Manchester code or the like, the CPU 11A decodes the Manchester code.

The RAM 11B temporarily stores programs executed by the CPU 11A and data required by the CPU 11A to operate. The programs executed by the CPU 11A are installed onto the EEPROM 11C. The EEPROM 11C also stores necessary data.

The I/F 12 is an interface between the host computer 2 and the microcomputer 11. The host computer 2 controls the microcomputer 11 via the I/F 12. The microcomputer 11 transfers data to the host computer 2 via the I/F 12.

The program executed by the microcomputer 11 (CPU 11A) can be installed onto the EEPROM 11C in advance or can be installed onto the EEPROM 11C from the host computer 2 via the I/F 12. Alternatively, the program can be recorded on a removable recording medium, such as a flexible disk, a CD-ROM (compact disc read only memory), an MO (magneto-optical) disc, a DVD (digital versatile disc), a magnetic disk, or a semiconductor memory, and can be installed onto the EEPROM 11C by driving the recording medium by a drive (not shown).

Further, the program can be wirelessly transferred from a download site to the reader/writer 1 via an artificial satellite for digital satellite broadcast, or can be transferred to the reader/writer 1 in a wired manner through a network such as a LAN (local area network) or the Internet. The reader/writer 1 can receive the transferred program in the I/F 12 and install it onto the EEPROM 11C.

The transmitting circuit 13 generates carrier waves of a predetermined single frequency from the antenna 15 and supplies the carrier waves to the modulating circuit 14.

The modulating circuit 14 modulates (e.g., by amplitude modulation (ASK (amplitude shift keying))) the carrier waves from the transmitting circuit 13 in accordance with a packet (command packet) supplied from the microcomputer 11, and supplies an obtained modulation signal to the antenna 15. Accordingly, electromagnetic waves corresponding to the modulation signal, which is generated by modulating the carrier waves in accordance with the packet supplied from the microcomputer 11 to the modulating circuit 14, are radiated from the antenna 15.

After transmitting the packet (command packet), the reader/writer 1 enters a reception waiting state to wait for receiving a response packet to the command packet. In the reception waiting state, the modulating circuit 14 supplies the carrier waves from the transmitting circuit 13 to the antenna 15 without modulating them. Thus, electromagnetic waves corresponding to the carrier waves are radiated from the antenna 15 in the reception waiting state.

More specifically, the IC card 3 transmits a packet (response packet) to the reader/writer 1 outputting the electromagnetic waves by performing a so-called load modulation, in which the electromagnetic waves (carrier waves) radiated from the reader/writer 1 are modulated by changing the impedance to the IC card 3 from the reader/writer 1 side. Therefore, the reader/writer 1 radiates the electromagnetic waves corresponding to the carrier waves in the reception waiting state to wait for receiving a response packet from the IC card 3.

The antenna 15 includes a closed-loop coil and radiates electromagnetic waves when a current (signal) flowing through the coil changes. When the IC card 3 is held over the reader/writer 1, so that the antenna 15 becomes close to the IC card 3 and that the IC card 3 changes the impedance from the reader/writer 1 side, the current (signal) flowing through the antenna 15 changes.

The demodulating circuit 16 receives and demodulates the current (signal) flowing through the antenna 15 so as to obtain (a Manchester code or the like of) a packet, and supplies the packet to the microcomputer 11.

The external circuit 17 is a secure tamper-resistant IC chip. The external circuit 17 encrypts data to be transmitted to the IC card 3 and decrypts data included in a packet supplied from the IC card 3 through the demodulating circuit 16 under control by the microcomputer 11.

The timer (circuit) 18 counts a timeout period under control by the microcomputer 11.

In this embodiment, the IC card 3 transmits a packet by performing a load modulation of modulating electromagnetic waves (carrier waves) output from the reader/writer 1. Alternatively, the IC card 3 can transmit a packet by outputting carrier waves and modulating the carrier waves. In that case, the reader/writer 1 stops outputting carrier waves in the reception waiting state.

The IC card 3 may obtain power from electromagnetic waves radiated from the reader/writer 1 or may include a battery in itself.

Figure 5:
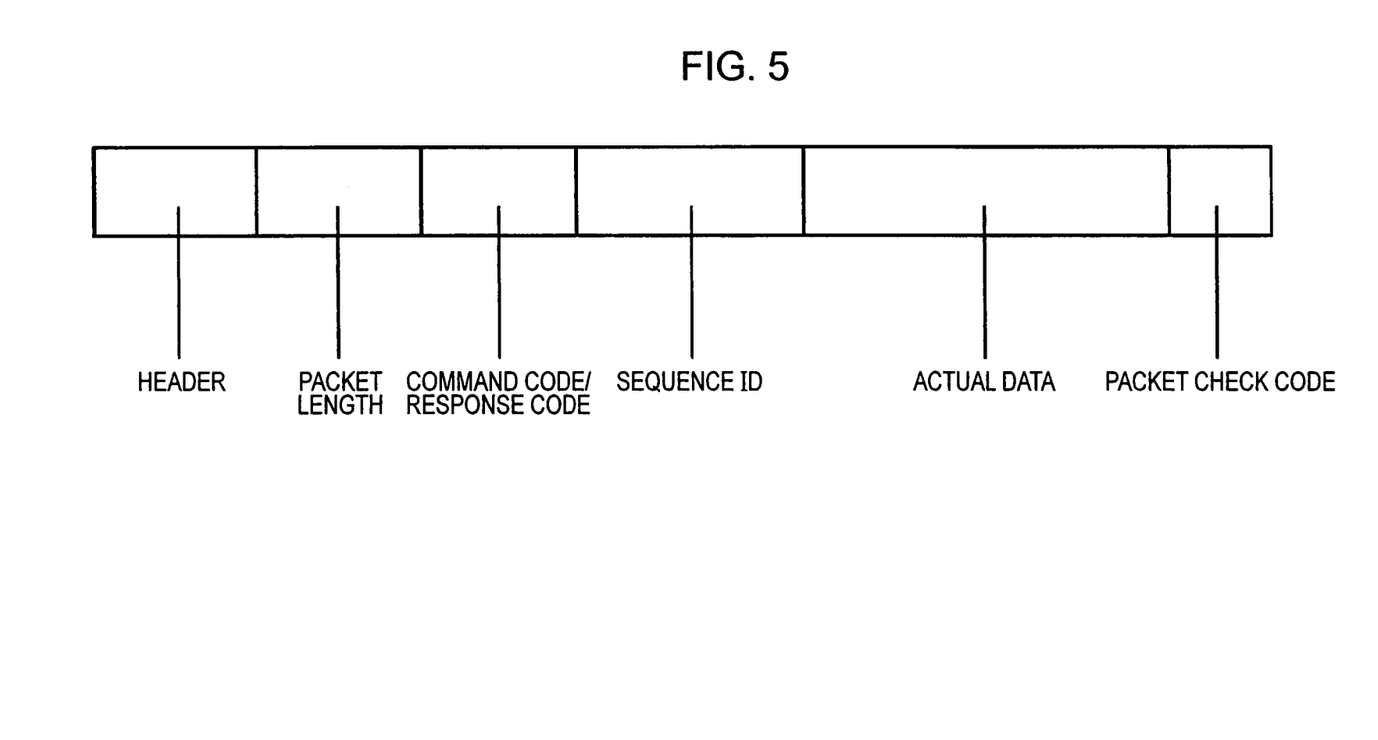
FIG. 5 shows a format of a packet transmitted by a reader/writer 1 or an IC card 3.

FIG. 5 shows a format of a packet (command packet or response packet) transmitted from the reader/writer 1 or the IC card 3 shown in FIG. 4.

The packet is composed of, from its head, a header, a packet length, a command code/response code, a sequence ID, actual data, and a packet check code.

The header includes predetermined information (header information). The packet length indicates the length (data length) of the entire packet.

The command code/response code indicates the type of the packet, that is, whether the packet is a command packet or a response packet, as described above.

The sequence ID is used to prevent masquerading and is a value that is incremented by one in the reader/writer 1 or the IC card 3, as described above. Before transmitting a packet, the reader/writer 1 sets the sequence ID of the packet to a value that is different from the sequence ID of the previously transmitted packet. Then, the IC card 3 receives the packet from the reader/writer 1. Before transmitting a response packet to the packet, the IC card 3 sets the sequence ID of the response packet to a value that is generated by incrementing the sequence ID of the packet from the reader/writer 1 by one. The reader/writer 1 receives the response packet from the IC card 3. Further, before transmitting a packet to the IC card 3, the reader/writer 1 sets the sequence ID of the packet to a value that is generated by incrementing the sequence ID of the response packet from the IC card 3 by one. In this way, the reader/writer 1 and the IC card 3 set the sequence ID of a packet to be transmitted to a value that is generated by incrementing the sequence ID of the previously received packet by one until the communication therebetween ends.

Therefore, the reader/writer 1 and the IC card 3 can determine whether a received packet is an incorrect packet by checking whether the sequence ID of the received packet has a value generated by incrementing the sequence ID of the previously transmitted packet by one.

The actual data is substantial data that is transmitted from the reader/writer 1 or the IC card 3 to the other. Herein, the actual data includes a command as necessary. Specifically, for example, when the reader/writer 1 requests reading data to the IC card 3, the reader/writer 1 transmits a command packet including a read command to request reading data. The read command is included in the command packet as actual data. Likewise, when the reader/writer 1 requests writing data to the IC card 3, the reader/writer 1 transmits a command packet including a write command to request writing data. In this case, the write command and the data to be written are included in the command packet as actual data.

The packet check code is an error checking (or detecting) code to check the coherence of the packet.

Next, the operation of the reader/writer 1 shown in FIG. 4 is described with reference to the flowchart shown in FIG. 6.

In step S101, (the CPU 11A of) the microcomputer 11 generates a command packet having the format shown in FIG. 5. Then, the process proceeds to step S102, where the microcomputer 11 controls transmission to transmit the command packet through electromagnetic waves. That is, the microcomputer 11 supplies the command packet to the modulating circuit 14 and controls the modulating circuit 14 so as to transmit the command packet.

The modulating circuit 14 modulates carrier waves supplied from the transmitting circuit 13 in accordance with the command packet supplied from the microcomputer 11 under control by the microcomputer 11 so as to obtain a modulation signal, and supplies the modulation signal to the antenna 15. Accordingly, electromagnetic waves corresponding to the modulation signal, which is generated by modulating the carrier waves in accordance with the packet supplied from the microcomputer 11 to the modulating circuit 14, are radiated from the antenna 15, so that the command packet is transmitted to the IC card 3.

Then, the process proceeds from step S102 to S103, where the microcomputer 11 calculates a timeout period during which a response packet to the command packet transmitted in step S102 is waited for. Also, the microcomputer 11 controls the timer 18 to start counting the timeout period. Accordingly, the timer 18 starts counting the timeout period and the reader/writer 1 enters a reception waiting state.

Herein, the microcomputer 11 sets a timeout period of about several milliseconds to several tens of milliseconds in accordance with the invention of the IC card system (e.g., an automatic ticket gate) or a command included in the command packet. Alternatively, the timeout period can be fixed to a predetermined period.

After the timer 18 starts counting the timeout period in step S103, the process proceeds to step S104, where the microcomputer 11 refers to the time counted by the timer 18 in order to check (determine) whether the timeout period has elapsed.

If it is determined in step S104 that the timeout period has not elapsed, the process proceeds to step S105, where the microcomputer 11 determines whether a packet has been received from the outside. If it is determined in step S105 that no packet has been received, the process returns to step S104 and the same steps are repeated.

If it is determined in step S105 that a packet has been received, that is, if an externally transmitted packet has been received by the antenna 15, demodulated by the demodulating circuit 16, and supplied to the microcomputer 11, the process proceeds to step S106. Then, in steps S106 to S108, error check is performed to check (determine) whether the packet supplied from the demodulating circuit 16 to the microcomputer 11 (hereinafter referred to as a received packet) has an error.

Specifically, in step S106, the microcomputer 11 refers to the packet length (FIG. 5) of the received packet and determines whether the received packet has an error based on the packet length.

A response packet to the command packet transmitted by the reader/writer 1 in step S102 has an expected packet length.

More specifically, for example, a response packet to a command packet including a read command to request reading data includes the data that is read in accordance with the read command, so that the length of the response packet is long to some extent. On the other hand, a response packet to a command packet including a write command to request writing data does not include the data used in the case of the read command, so that the length of the response packet is short.

Therefore, the length of the response packet to the command packet including a read command is expected to be long to some extent, whereas the length of the response packet to the command packet including a write command is expected to be short.

In step S106, it is determined whether the received packet has an error based on whether the received packet has the packet length expected for the response packet to the command packet that is transmitted in step S102.

If it is determined in step S106 that the received packet has an error based on the packet length thereof, that is, if the packet length of the received packet is different from the packet length expected for the response packet to the command packet transmitted in step S102, the microcomputer 11 abandons the received packet to return to step S104 and continues to check whether the timeout period has elapsed.

That is, if the received packet received within the timeout period has an error, the microcomputer 11 does not perform retransmission (described below). In other words, the microcomputer 11 does not retransmit the command packet but continues to check whether the timeout period has elapsed.

If it is determined in step S106 that the received packet does not have an error based on the packet length, that is, if the received packet has the packet length expected for the response packet to the command packet transmitted in step S102, the process proceeds to step S107. In step S107, the microcomputer 11 refers to the packet check code (FIG. 5) of the received packet and determines whether the received packet has an error based on the packet check code.

If it is determined in step S107 that the received packet has an error based on the packet check code of the received packet, the microcomputer 11 abandons the received packet and returns to step S104, and then continues to check whether the timeout period has elapsed.

In other words, if the received packet that is received within the timeout period has an error, the microcomputer 11 does not retransmit the command packet but continues to check whether the timeout period has elapsed.

If it is determined in step S107 that the received packet does not have an error based on the packet check code, the process proceeds to step S108, where the microcomputer 11 refers to the command code/response code (FIG. 5) of the received packet so as to determine whether the received packet has an error based on the command code/response code.

If it is determined in step S108 that the received packet has an error based on the command code/response code of the received packet, that is, if the command code/response code of the received packet does not match the response code that is expected for the response packet to the command packet transmitted in step S102, the microcomputer 11 abandons the received packet and returns to step S104, and continues to check whether the timeout period has elapsed.

That is, if the received packet received within the timeout period has an error, the microcomputer 11 does not retransmit the command packet but continues to check whether the timeout period has elapsed.

On the other hand, if it is determined in step S108 that the received packet does not have an error based on the command code/response code, that is, if the command code/response code of the received packet matches the response code that is expected for the response packet to the command packet transmitted in step S102, the process proceeds to step S109, where the microcomputer 11 determines that the received packet is a correct response packet to the command packet transmitted in step S102 and performs a process in accordance with the response packet, and then the process ends.

For example, assume that the IC card 3 has a function of a pass, that the command packet transmitted in step S102 includes a read command to request reading data about the period of validity and the available zone of the pass, and that a correct response packet including the data about the period of validity and the available zone of the pass can be obtained as a response packet to the command packet. In that case, the microcomputer 11 checks whether the period of validity and the available zone of the pass are right in response to the response packet.

On the other hand, if it is determined in step S104 that the timeout period has elapsed, that is, if the microcomputer 11 could not receive a correct response packet (without error) within the timeout period, the process proceeds to step S110, where the microcomputer 11 retransmits the command packet that was transmitted in step S102, and then the process ends.

Figure 6:
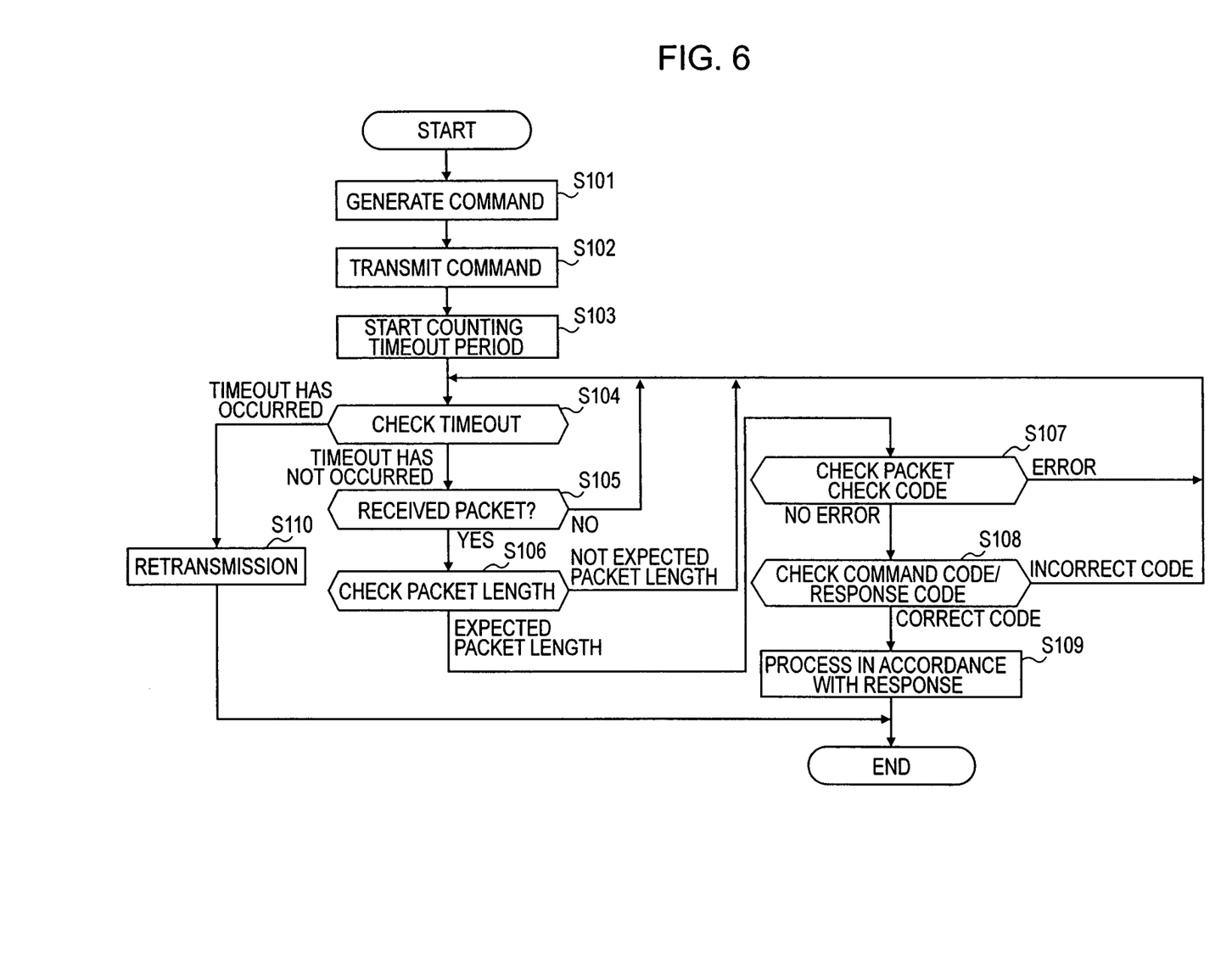
FIG. 6 is a flowchart illustrating the operation of the reader/writer 1.

That is, in step S110, steps S101 to S110 of the flowchart shown in FIG. 6 are recursively performed, so that the command packet is retransmitted.

As described above, if the received packet that is received within the timeout period has an error, the reader/writer 1 does not retransmit the command packet but continues to check whether the timeout period has elapsed. That is, before the timeout occurs, the reader/writer 1 does not retransmit the command packet even if the received packet has an error, but waits for receiving a packet in a reception waiting state. If the received packet that is received within the timeout period does not have an error, the reader/writer 1 regards the received packet as a correct response packet to the command packet and performs a process in accordance with the response packet. The reader/writer 1 retransmits the command packet only after the timeout period has elapsed. Therefore, even if another reader/writer is placed close to the reader/writer 1, the reader/writer 1 can communicate with the IC card 3 held thereover while suppressing the effect of interference caused by the another reader/writer, as described below with reference to FIGS. 7 and 8.

The reader/writer 1 does not retransmit the command packet immediately after detecting an error in the received packet, but retransmits the command packet only after the timeout period has elapsed. Accordingly, the frequency of transmission (retransmission) of the command packet decreases. As a result, when the IC card 3 is held over another reader/writer that is placed close to the reader/writer 1, interference of the communication between the another reader/writer and the IC card 3, which is caused by frequent retransmission of the command packet by the reader/writer 1, can be suppressed.

Next, the operations of the reader/writer 1, the IC card 3, and another reader/writer performed when the IC card 3 is held over the reader/writer 1 in a condition where the another reader/writer is placed close to the reader/writer 1 are described with reference to FIGS. 7 and 8.

The another reader/writer has the same configuration as that of the reader/writer 1 shown in FIG. 4.

First, the operations of the reader/writer 1, the IC card 3, and the another reader/writer performed when the reader/writer 1 can receive a response packet from the IC card 3 held thereover within the timeout period are described with reference to FIG. 7.

Figure 7:
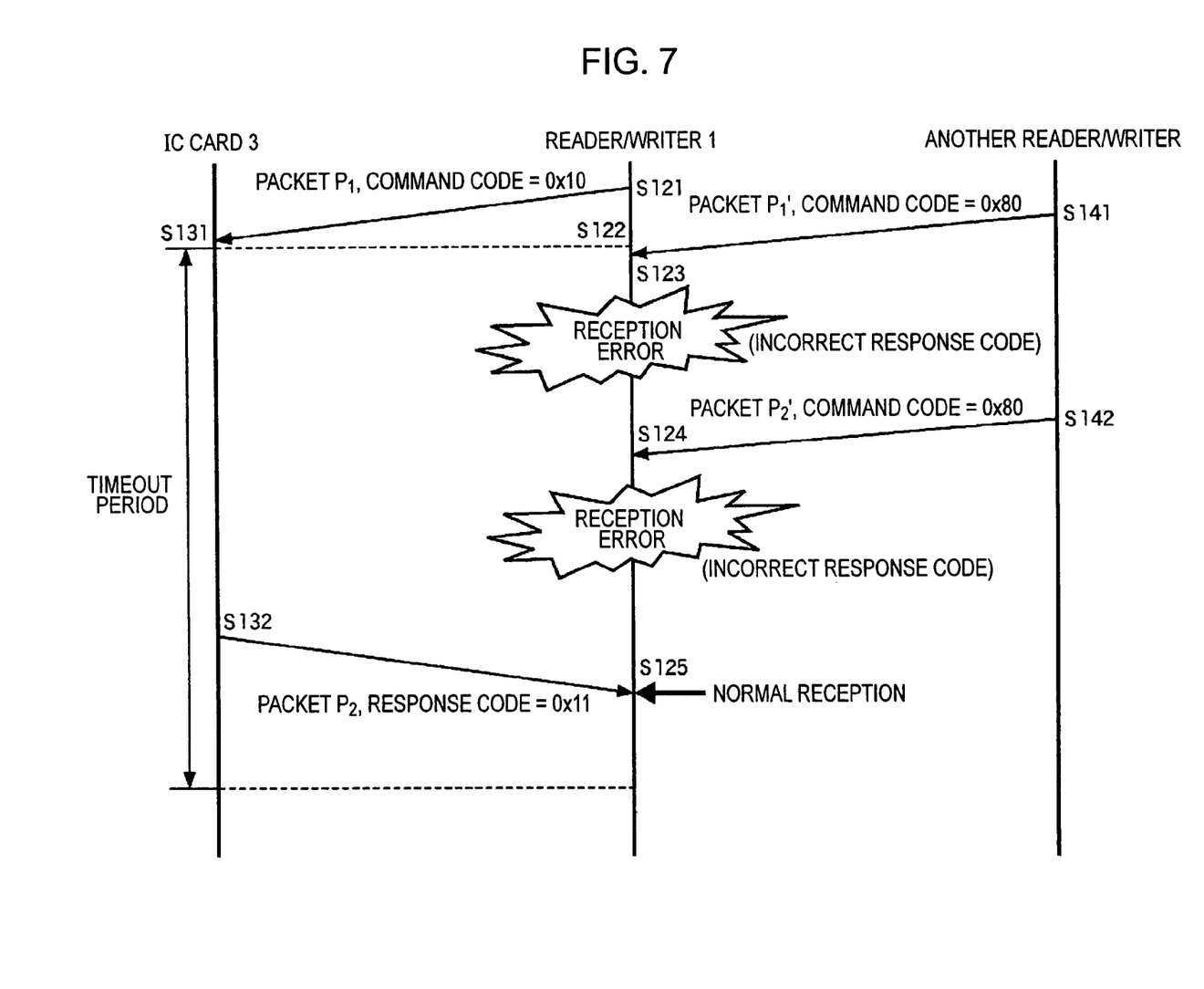
FIG. 7 is a flowchart (arrow chart) illustrating the operations of the reader/writer 1, the IC card 3, and another reader/writer.

In FIG. 7, the reader/writer 1 transmits a command packet P1 having a command code of 0x10 in step S121. Then, in step S122, the reader/writer 1 starts counting the timeout period so as to enter a reception waiting state.

Herein, assuming that the response code of the response packet to the command packet having the command code 0x10 is 0x11, the reader/writer 1 waits for receiving a response packet having a response code of 0x11 in the reception waiting state in step S122.

In step S131, the IC card 3 receives the command packet P1 having the command code 0x10 from the reader/writer 1 and starts a process in accordance with the command packet P1.

On the other hand, another reader/writer is performing polling to detect that an IC card is held thereover (that an IC card exists at a nearby position). Specifically, another reader/writer periodically transmits a command packet having a command code of 0x80.

In FIG. 7, another reader/writer transmits a command packet $P_1'$ having a command code of 0x80 in step S141. After that, another reader/writer periodically transmits a command packet having the command code 0x80.

The reader/writer 1 receives the packet P1' from another reader/writer in step S123 after the reception waiting state started in step S122.

The packet $P_1'$ from another reader/writer is a command packet having the command code 0x80, and is not a response packet to the command packet $P_1$ expected to be received by the reader/writer 1, that is, a packet having the response code 0x11. Therefore, the reader/writer 1 determines that the packet $P_1'$ received in step S123 has an error and abandons the packet $P_1'$. Further, since the timeout period has not yet elapsed, the reader/writer 1 continues to count the timeout period (and reception waiting state).

Then, in step S142, another reader/writer transmits a command packet $P_2'$ having a command code of 0x80. In step S124, the reader/writer 1 receives the packet P2' from the other reader/writer.

As the packet $P_1'$, which was previously received by the reader/writer 1 (in step S123), the packet $P_2'$ from another reader/writer is a command packet having the command code 0x80 and is not a packet having the response code 0x11 expected to be received by the reader/writer 1. Therefore, the reader/writer 1 determines that the packet $P_2'$ received in step S124 has an error and abandons it. Then, since the timeout period has not yet elapsed, the reader/writer 1 continues to count the timeout period (and the reception waiting state).

On the other hand, the IC card 3 completes the process in accordance with the command packet $P_1$ from the reader/writer 1 and then transmits a packet $P_2$ having a response code of 0x11 as a response packet to the command packet $P_1$ in step S132.

At this time, the reader/writer 1 is counting the timeout period and is in the reception waiting state, and thus receives the packet $P_2$ from the IC card 3 in step S125.

The packet $P_2$ from the IC card 3 is a response packet having the respond code 0x11 and is a packet to be received by (expected by) the reader/writer 1. Therefore, the reader/writer 1 determines that the packet $P_2$ received in step S125 is a correct response packet without error, ends counting the timeout period, and performs a process in accordance with the response packet $P_2$.

As described above, within the timeout period, the reader/writer 1 does not retransmit the command packet and waits for receiving a packet even if the received packet has an error. When receiving a packet having no error, the reader/writer 1 determines that the received packet having no error is a correct response packet to the command packet and performs a process in accordance with the response even if another packet received in the timeout period has an error.

Therefore, unlike in the case shown in FIG. 2 where the command packet is retransmitted upon detection of an error in a received packet, the reception of a response packet from the IC card 3 by the reader/writer 1 is less likely to be interfered by retransmission of the command packet.

Next, the operations of the reader/writer 1, the IC card 3, and the another reader/writer performed when the reader/writer 1 cannot receive a response packet from the IC card 3 held thereover within the timeout period are described with reference to FIG. 8.

Figure 8:
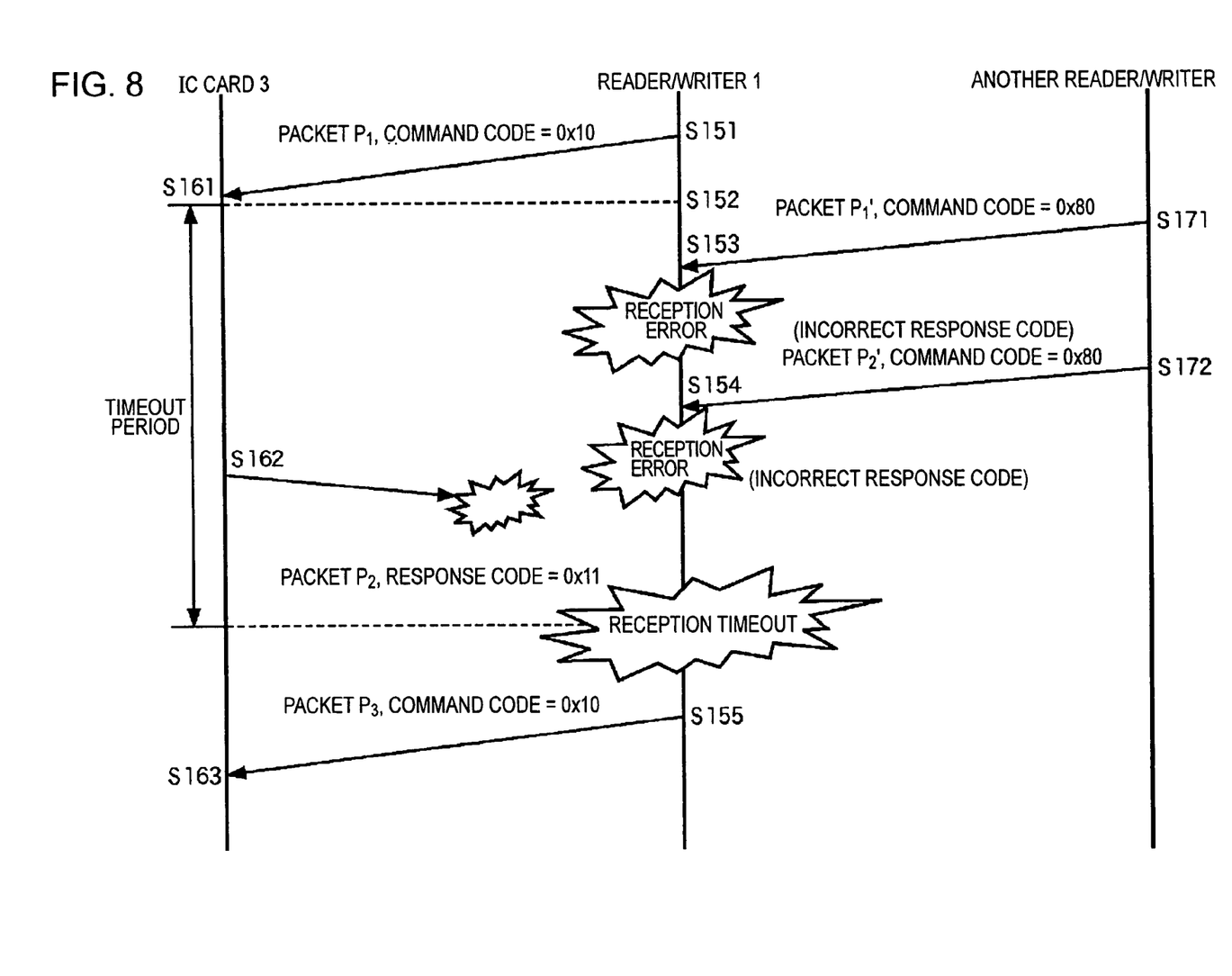
FIG. 8 is a flowchart illustrating the operations of the reader/writer 1, the IC card 3, and another reader/writer.

In FIG. 8, the reader/writer 1 transmits a command packet P1 having a command code of 0x10 in step S151. Then, the process proceeds to step S152, where the reader/writer 1 starts counting the timeout period and enters a reception waiting state.

That is, as in step S122 shown in FIG. 7, the reader/writer 1 enters a reception waiting state to wait for receiving a response packet to the command packet having the command code 0x10, that is, a response packet having a respond code of 0x11.

In step S161, the IC card 3 receives the command packet $P_1$ having the command code 0x10 transmitted by the reader/writer 1 and starts a process in accordance with the command packet $P_1$.

On the other hand, the other reader/writer periodically transmits a command packet having a command code of 0x80, as in the case shown in FIG. 7.

In FIG. 8, the other reader/writer transmits a command packet $P_1'$ having the command code 0x80 in step S171. After that, the other reader/writer periodically transmits a command packet having the command code 0x80.

The reader/writer 1 receives the packet $P_1'$ from the another reader/writer in step S153 after the reception waiting state started in step S152.

The packet $P_1'$ from the other reader/writer is a command packet having the command code 0x80 and is not a packet having a response code of 0x11 that is expected to be received by the reader/writer 1. Therefore, the reader/writer 1 determines that the packet $P_1'$ received in step S153 has an error and abandons the packet $P_1'$. Further, since the timeout period has not yet elapsed, the reader/writer 1 continues to count the timeout period (and the reception waiting state).

Then, in step S172, the other reader/writer transmits a command packet $P_2'$ having the command code 0x80. In step S154, the reader/writer 1 receives the packet $P_2'$ from the other reader/writer.

As the packet $P_1'$, which was previously received by the reader/writer 1 (in step S153), the packet $P_2'$ from the other reader/writer is not a packet having a response code of 0x11 expected to be received by the reader/writer 1. Therefore, the reader/writer 1 determines that the packet $P_2'$ received in step S154 has an error and abandons it. Then, since the timeout period has not yet elapsed, the reader/writer 1 continues to count the timeout period (and the reception waiting state).

On the other hand, the IC card 3 completes the process in accordance with the command packet $P_1$ from the reader/writer 1. Then, in step S162, the IC card 3 transmits a packet $P_2$ having a response code of 0x11 as a response packet to the command packet $P_1$. Herein, assume that the packet $P_2$ is transmitted at the same time when the reader/writer 1 is receiving the packet $P_2'$ from the another reader/writer in step S154 and that the reader/writer 1 cannot receive the packet $P_2$ from the IC card 3.

In this case, the IC card 3 transmitted the response packet $P_2$ to the command packet $P_1$ in step S162, and thus does not retransmit the response packet $P_2$.

On the other hand, the reader/writer 1 is waiting for receiving a response packet to the command packet $P_1$. However, the IC card 3 has already transmitted the response packet $P_2$ to the command packet $P_1$ (in step S162) and does not retransmit the response packet $P_2$. Accordingly, the timeout period elapses while the reader/writer 1 cannot receive the response packet to the command packet $P_1$.

After the timeout period has elapsed, the reader/writer 1 retransmits the command packet in step S155. That is, the reader/writer 1 transmits a command packet $P_3$ as a packet having the command code 0x10.

The IC card 3 receives the command packet $P_3$ from the reader/writer 1 in step S163. Then, the IC card 3 performs a process in accordance with the command packet $P_3$ and transmits a response packet to the command packet $P_3$.

As described above, the reader/writer 1 retransmits the command packet only after the timeout period has elapsed. Therefore, frequent retransmission of the command packet can be prevented. Further, even if the reader/writer 1 fails to receive a response packet from the IC card 3 for some reason, the reader/writer 1 can receive the response packet from the IC card 3 by retransmitting the command packet after the timeout period has elapsed.

In the flowchart shown in FIG. 6, whether the received packet has an error is determined based on the packet length (data length), the packet check code (code for checking an error), and the command code/response code (code indicating the type of the received packet) of the received packet. Alternatively, whether the received packet has an error can be determined based on the sequence ID (FIG. 5) of the received packet.

In the flowchart shown in FIG. 6, whether the received packet has an error is determined by referring to the packet length, the packet check code, and the command/response code of the received packet in this order. However, the packet length, the packet check code, and the command/response code may be referred to in another order so as to determine whether the received packet has an error.

The process shown in the flowchart of FIG. 6 can be performed by allowing the microcomputer 11 to execute a program or by using dedicated hardware.

As described above, before the timeout occurs, the reader/writer 1 does not retransmit the command packet even if the received packet has an error but waits for receiving a packet in the reception waiting state. If the packet received within the timeout period does not have an error, the reader/writer 1 determines that the received packet is a correct response packet to the command packet and performs a process in accordance with the response packet. The reader/writer 1 retransmits the command packet only after the timeout period has elapsed. Therefore, compared to the case shown in FIGS. 2 and 3 where the command packet is retransmitted upon detection of an error in the received packet, the command packet is retransmitted less frequently. As a result, even under the environment where the reader/writer 1 is close to another reader/writer and interference therebetween occurs, the reader/writer 1 over which the IC card 3 is held can communicate with the IC card 3 by suppressing an effect of interference.

The process of retransmitting the command packet upon detection of an error in the received packet (the process performed by the reader/writer A described with reference to FIGS. 1 to 3) can be easily changed to the process of not retransmitting the command packet even if the received packet has an error and waiting for receiving a packet in a reception waiting state before the timeout occurs, regarding the received packet as a correct response packet to the command packet and performing a process in accordance with the response packet if the packet received within the timeout period does not have an error, and retransmitting the command packet only after the timeout period has elapsed (the process performed by the reader/writer 1), by changing part of the program executed by the microcomputer 11 without adding new hardware.

Therefore, even if the reader/writer 1 is under an environment of causing interference between the reader/writer 1 and another reader/writer, that is, even if the reader/writer 1 is placed close to another reader/writer, the reader/writer 1 can easily communicate with the IC card 3.

As a result, the reader/writer 1 can be set while interference between the reader/writer 1 and another reader/writer is hardly considered. Since the setting condition is less severe than in the known art, various costs required to set the reader/writer 1 can be reduced. Further, the reader/writer 1 can be set in various environments and the IC card system including the reader/writer 1 can be used for various inventions.

As described above, the reader/writer 1 can be configured without adding new hardware, so that an increase in the cost of manufacturing the reader/writer 1 can be suppressed.

Further, since the command packet is retransmitted less frequently, interference of the communication between another reader/writer close to the reader/writer 1 and the IC card 3 caused by retransmission of the command packet by the reader/writer 1 occurs less frequently. Also, interference of the communication between the reader/writer 1 and the IC card 3 caused by retransmission of the command packet by another reader/writer close to the reader/writer 1 occurs less frequently. As a result, the communication performance between the reader/writer and the IC card 3 (responsibility of the IC card 3) is improved, so that the substantial communication speed can be increased.

Further, since the command packet is retransmitted less frequently, the power consumption in the reader/writer 1 can be reduced.

Embodiments of the present invention applied to an IC card system have been described above. The present invention can also be applied to a system of performing noncontact communication (wireless communication), such as a wireless tag system.

In this specification, the processing steps describing the program allowing the computer (the CPU 11A of the microcomputer 11) to execute various processes need not always be performed in time series in the order described in the flowchart, but can be performed in parallel or individually (e.g., including parallel processing or processing by an object).

The program can be processed by a computer or can be processed by a plurality of computers in a distributed manner.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A communication apparatus for performing communication in a noncontact manner, the communication apparatus comprising:
   a processor; and
   a memory device storing instructions which when executed by the processor, cause the processor to:
   (a) wirelessly transmit a command packet to an IC card, the command packet:
      (i) including a first data indicative of a timeout period; and
      (ii) being associated with a designated response packet which includes a second data which is determined based on the first data;
   (b) start the timeout period during which a receiver in the communication apparatus is enabled to receive data;
   (c) determine whether the timeout period has elapsed;
   (d) retransmit the command packet only after the timeout period has elapsed;
   (e) determine whether data received within the timeout period includes:
      (i) an error; and
      (ii) the second data;
   (f) in response to a first determination that the data received within the timeout period: (i) does not include the error; and (ii) includes the second data,
      using the designated response packet, perform a process; and
   (g) in response to a second determination that the data received within the timeout period: (i) includes the error; and (ii) the timeout period has not elapsed:
      (A) cause the command packet to not be retransmitted; and
      (B) continue to determine whether the timeout period has elapsed without restarting the timeout period.

2. The communication apparatus of claim 1, wherein:
   (a) the received data includes an error checking code or a code indicating a type of the received data; and
   (b) the instructions, when executed by the processor, cause the processor to determine whether the received data has an error based on the error checking code or the code indicating the type of the received data.

3. The communication apparatus of claim 1, wherein:
   (a) the designated response packet includes an expected packet length which is based on the transmitted command packet;
   (b) the data received includes a received packet length; and
   (c) the instructions, when executed by the processor, cause the processor to determine whether the packet length of the received data is the expected packet length.

4. The communication apparatus of claim 1, wherein the receiver is an integrated circuit card.

5. A method of operating a communication apparatus which includes a memory device storing instructions, the method comprising:
   (a) causing a processor to execute the instructions to wirelessly transmit a command packet to an IC card, the command packet:
      (i) including a first data indicative of a timeout period; and
      (ii) being associated with a designated response packet which includes a second data which is determined based on the first data;
   (b) causing the processor to execute the instructions to start the timeout period during which a receiver in the communication apparatus is enabled to receive data;
   (c) causing the processor to execute the instructions to determine whether the timeout period has elapsed;
   (d) causing the processor to execute the instructions to retransmit the command packet only after the timeout period has elapsed;
   (e) causing the processor to execute the instructions to determine whether data received within the timeout period includes:
      (i) an error; and
      (ii) the second data;
   (f) causing the processor to execute the instructions to, in response to a first determination that the data received within the timeout period: (i) does not include the error; and (ii) includes the second data,
      using the designated response packet, perform a process; and
   (g) causing the processor to execute the instructions to, in response to a second determination that the data received within the timeout period: (i) includes the error; and (ii) the timeout period has not elapsed:
      (A) cause the command packet to not be retransmitted; and
      (B) continue to determine whether the timeout period has elapsed without restarting the timeout period.

6. A non-transitory computer-readable medium storing instructions structured to cause a communication apparatus to:
   (a) wirelessly transmit a command packet to an IC card, the command packet:
      (i) including a first data indicative of a timeout period; and
      (ii) being associated with a designated response packet which includes a second data which is determined based on the first data;
   (b) start the timeout period during which a receiver in the communication apparatus is enabled to receive data;
   (c) determine whether the timeout period has elapsed;
   (d) retransmit the command packet only after the timeout period has elapsed;
   (e) determine whether data received within the timeout period includes:
      (i) an error; and
      (ii) the second data;
   (f) in response to a first determination that the data received within the timeout period: (i) does not include the error; and (ii) includes the second data,
      using the designated response packet, perform a process; and
   (g) in response to a second determination that the data received within the timeout period: (i) includes the error; and (ii) the timeout period has not elapsed:
      (A) cause the command packet to not be retransmitted; and
      (B) continue to determine whether the timeout period has elapsed without restarting the timeout period.

* * * * *